United States Patent [19]

Timuska

[11] Patent Number: 5,219,499
[45] Date of Patent: Jun. 15, 1993

[54] METHOD FOR MANUFACTURING SCREW ROTORS

[75] Inventor: Karlis Timuska, Spanga, Sweden

[73] Assignee: Svenska Rotor Maskiner AB, Stockholm, Sweden

[21] Appl. No.: 793,227

[22] PCT Filed: Apr. 4, 1989

[86] PCT No.: PCT/SE89/00173
§ 371 Date: Sep. 17, 1990
§ 102(e) Date: Sep. 17, 1990

[87] PCT Pub. No.: WO89/09881
PCT Pub. Date: Oct. 19, 1989

Related U.S. Application Data

[63] Continuation of Ser. No. 573,145, Sep. 17, 1990, abandoned.

[30] Foreign Application Priority Data

Apr. 7, 1988 [SE] Sweden ................................ 8801276

[51] Int. Cl.⁵ .................... B29C 45/14; B29C 67/04
[52] U.S. Cl. ................................. 264/46.4; 264/46.7; 264/112; 264/113; 264/125; 264/255; 415/72
[58] Field of Search ............. 264/255, 125, 250, 45.1, 264/46.4, 48, 112, 113, 46.7; 415/72, 173.4; 418/152

[56] References Cited

U.S. PATENT DOCUMENTS

| | | | |
|---|---|---|---|
| 2,519,588 | 8/1950 | McCulloch | 29/89.5 |
| 3,535,057 | 10/1970 | Kodra | 418/201.1 |
| 3,841,805 | 10/1974 | Zalis | 418/220 |
| 3,967,722 | 7/1976 | Dietert | 415/72 |

FOREIGN PATENT DOCUMENTS 199622 10/1985 Japan ................................ 264/255

Primary Examiner—Jan H. Silbaugh
Assistant Examiner—Brian J. Eastley
Attorney, Agent, or Firm—Frishauf, Holtz, Goodman & Woodward

[57] ABSTRACT

A method of manufacturing rotors having helical lands and intermediate grooves wherein a multi-layer rotor body (2) is moulded or otherwise formed on a shaft (1) to only a small degree of accuracy, whereafter an outer layer (3) of polymer-based material is moulded on the rotor body to a high degree of accuracy. For the purpose of eliminating shrinkage-induced distortion of the lands of the rotor body (2) subsequent to applying the outer layer, the rotor body is produced in a multiple of layers (21, 22), by casting or like moulding processes, with each of the body layers having a thickness which is greater than that of the high accuracy outer layer (3).

12 Claims, 1 Drawing Sheet

METHOD FOR MANUFACTURING SCREW ROTORS

This application is a continuation of application Ser. No. 07/573,145 filed Sep. 17, 1990, now abandoned.

BACKGROUND OF THE INVENTION

The present invention relates to a method for manufacturing helical screw rotors. The invention also relates to rotors manufactured in accordance with the method.

Normally, helical screw rotors are machined from solid metal blanks. Moreover, the rotors have a complicated geometric shape, which places a great demand on accuracy in manufacture. Machining of the rotors from solid rotor blanks also involves the removal of large quantities of material from the blank. All of this results in long manufacturing times and high production costs.

Consequently, there has long been a demand for a simpler method for the manufacture of helical screw rotors, without the need to observe such high precision in manufacture, such that rotors of this kind can be produced in large numbers at reasonable cost.

Swedish Patent Application No. 8603720-7 and PCT/SE87/00397 teach a number of known methods for the manufacture of helical screw rotors, in which manufacture is simplified by moulding a plastic surface layer onto a plastic or a metal rotor body, which in turn is mounted on a metal shaft. These known methods are based on the concept of first producing a rotor body with no particular attention to measurement accuracies, and then moulding onto the body a surface layer formed to exact measurements. The desired result is normally achieved, when the rotor body is made of metal. Although plastic-moulded rotor bodies represent a considerable simplification in the manufacture of such bodies, subsequent shrinkage of the plastics material creates drawbacks which are not found when casting or moulding other kinds of plastic objects, where subsequent shrinkage of the plastics material can be anticipated and compensated for. The particular difficulties which manifest when moulding helical screw rotors relate to the helically extending cams, which as a result of the shrinkage become distorted in a manner which cannot readily be calculated prior to manufacture. This distortion changes the pitch of the cams in the vicinity of the ends thereof.

The effect of this shrinkage-induced distortion can be eliminated in some cases, by imparting to the thin-wall lands or threads of female rotors a degree of elasticity which will allow the lands to be deformed elastically in operation. This feature will also afford certain advantages, as reported in PCT/SE86/00109.

Another solution must be found, however, in the case of male rotors and female rotors of larger land-wall thicknesses.

SUMMARY OF THE INVENTION

This solution is provided by the present invention, according to which the rotor body is moulded, injection moulded, etc., from several layers of solidifying material, suitably a material composite, such as to allow especially shrinkage-induced distortion of the lands or threads to be eliminated, by application of the outer layer. The degree of distortion and measurement deviations which remain despite moulding the rotor body in several layers will not be so great as to prevent the distortion and measurement deviations from being eliminated, by moulding the outer layer of polymer-based material onto the rotor body, which layer can then be made relatively thin and consequently will have negligible shrinkage.

The rotor body can be moulded in accordance with one of a number of different methods, including sintering, using many different kinds of materials. All of the layers of the rotor body will preferably be made from a polymer-based material, suitably a material composite, i.e. a material reinforced with fibres in accordance with known techniques.

BRIEF DESCRIPTION OF THE DRAWINGS

The invention will now be described in more detail with reference to an exemplifying embodiment thereof illustrated in the accompanying drawing, in which.

DETAILED DESCRIPTION

Figure 1:
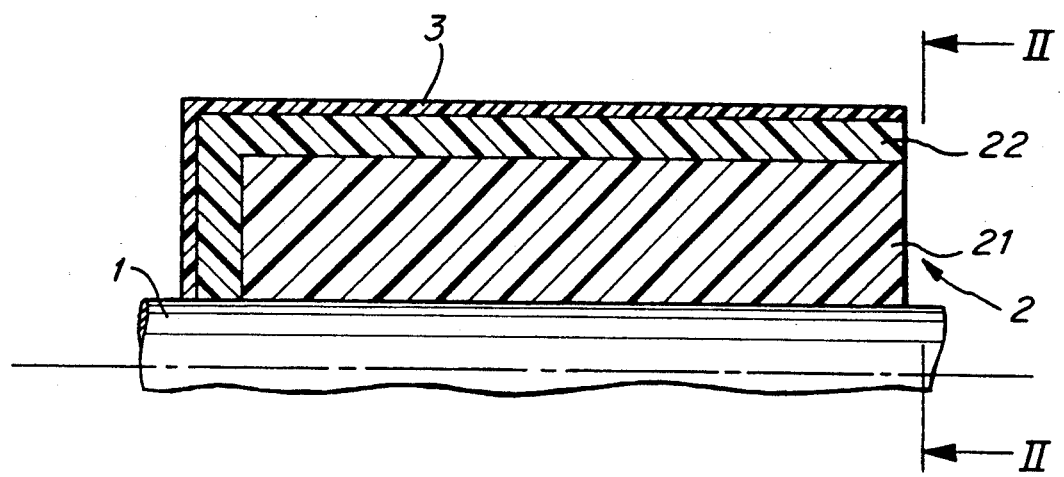
FIG. 1 illustrates in axial section the top half of a rotor manufactured in accordance with the invention.
Figure 2:
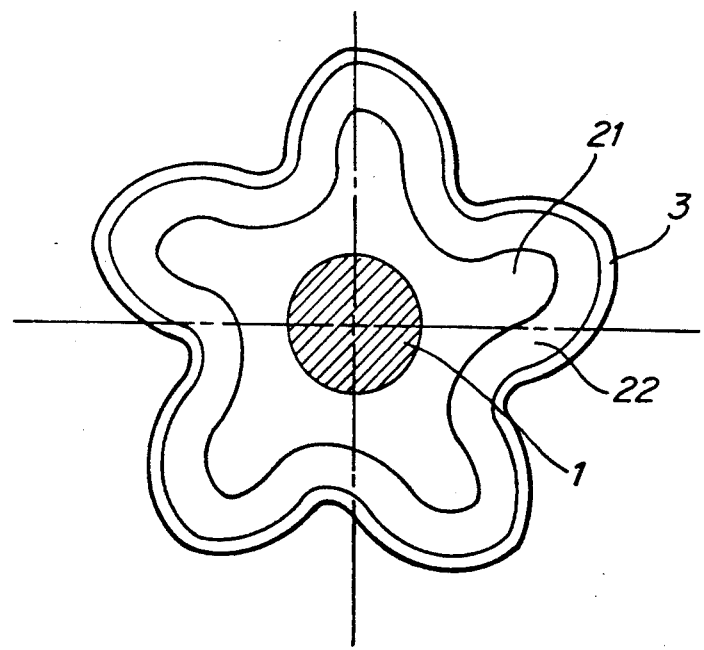
FIG. 2 is a sectional view taken on the line II—II in FIG. 1.

The illustrated rotor, which is a male rotor, includes a shaft 1, which may be made of steel or a reinforced plastics material of extremely high bending strength, and a rotor body 2 which has moulded thereon an outer layer 3 of polymer-based material. The illustrated rotor body 2 comprises two body layers 21, 22 of polymer-based material, of which the innermost body layer 21 is somewhat thicker than the outermost layer 22. Shrinkage of the body layer 21 shall have terminated, before moulding of the outer layer 22 is complete. Similarly, shrinkage of the outermost of said two body layers shall have terminated, prior to moulding of the thin outer layer 3 being completed, thereby to achieve the highest possible measurement accuracy and the least possible distortion of the rotor lands, in the simplest possible manner.

To ensure uniform solidification of the rotor body, the thickness of each layer will preferably be as uniform as possible. The shaft embodiment with helical lands or threads described in the aforesaid PCT/SE86/00109 can be used to this end, and when different materials are used, the thermal coefficient of expansion of the layers should be so selected in respect of the material of adjacent layers and the material of the shaft and the outer layer 3 as to ensure that the smallest possible differences in thermal expansion are obtained.

In the case of the preferred embodiment, the shaft 1 is made of steel which has a thermal coefficient of expansion of $\alpha = 12 \times 10^{-6}$ m/m/°K, the layer 21 is made of polyetherimide with a 30% glass-reinforcement, ULTEM 2300 ® (General Electric) with a density of 1.51 g/cm$^3$, a bending modulus of 9000 N/mm$^2$, $\alpha = 20 \times 10^{-6}$ m/m°K, the layer 22 is made of a polyetherimide ULTEM 2100 ® with a 10% glass-reinforcement, density 1.34, bending modulus 4500 N/mm$^2$, and $\alpha = 32 \times 10^{-6}$. The outer layer 3 consists solely of polytetrafluoroethylene plastic (Teflon ®) and varies in thickness from about 1/100 mm to 1-2 mm depending on the extent of subsequent shrinkage of the rotor body, prior to moulding of the outer layer 3 being completed.

It will be understood that the invention is not restricted to the described and illustrated embodiment thereof and that many modifications are possible within the scope of the inventive concept defined in the following claims. For instance, the various layers may include particles of metal and/or ceramic material, in addition to reinforcement fibres of greater or smaller lengths. At least one of the outer layers of the rotor body may comprise a porous plastic material, in which case the density will preferably increase in a direction towards the two faces of the layer.

I claim:

1. A method for manufacturing rotors for screw rotor machines, which rotors have helical lands extending along the length of the rotors, with intermediate grooves between said lands, comprising the steps of:

forming a multi-layer rotor body (2) around a carrier shaft (1);

said step of forming said multi-layer rotor body (2) comprising forming a plurality of body layers (21, 22) each of a solidifying material selected such that differences in coefficients of thermal expansion of each of the solidifying materials are minimized, which body layers all are formed with helical lands and intermediate grooves, at least one of said body layers being a material composite; and thereafter forming a thin-walled integral outer layer (3) of polymer-based material, formed with great measurement accuracy, on the formed multi-layer rotor body (2), for eliminating shrinkage-induced angular distortion that causes changes in the pitch of the lands of the plurality of body layers (21, 22) in the vicinity of the ends thereof caused by solidification of the material of said plurality of body layers (21, 22), said thin-walled integral outer layer (3) having a wall-thickness compensating for deviation of the pitch of the lands, after solidification of the plurality of body layers of the multi-layer rotor body (2), from an intended final form of the rotor, shrinkage of each layer being terminated prior to forming a subsequent layer.

2. The method of claim 1, wherein at least one of the body layers of the multi-layer rotor body is formed by sintering.

3. The method of claim 1, wherein at least one of the body layers of the multi-layer rotor body is formed by casting.

4. The method of claim 1, wherein at least one of the body layers of the multi-layer rotor body is formed by molding.

5. The method of any one of claims 1, 2, 3 or 4, wherein at least one of the body layers of the multi-layer rotor body is formed from a porous material, the body layer of porous material having a density which increases in the directions towards two faces of the porous material body layer.

6. The method of claim 5, wherein the thickness of the body layers of the multi-layer rotor body decreases outwardly from within.

7. The method of claim 6, wherein the outer layer has a smaller thickness than any of the other layers of the multi-layer rotor body.

8. The method of any one of claims 1, 2, 3 or 4 wherein the thickness of the body layers of the multi-layer rotor body decreases outwardly from within.

9. The method of claim 8, wherein the outer layer has a smaller thickness than any of the other layers of the multi-layer rotor body.

10. The method of any one of claims 1, 2, 3 or 4, wherein the outer layer has a smaller thickness than any of the other layers of the multi-layer rotor body.

11. The method of claim 1, comprising forming two of said body layers of polymer-based material; the innermost body layer being thicker than the outermost body layer; said outer layer being applied after shrinkage of at least said outermost body layer is completed.

12. The method of claim 11, wherein said outer layer is made of polytetrafluoroethylene, and varies in thickness from about 1/100 mm to about 1-2 mm.

* * * * *